3,632,846
PETROLEUM HYDROCARBONS CONTAINING
POLYESTER STABILIZERS
Richard D. Cassar, West Chester, Pa., and Jackson S. Boyer, Claymont, Del., assignors to Sun Oil Company, Philadelphia, Pa.
No Drawing. Filed Mar. 10, 1969, Ser. No. 805,819
Int. Cl. C08g 51/52; C10l 1/18
U.S. Cl. 260—28                                 16 Claims

ABSTRACT OF THE DISCLOSURE

Petroleum hydrocarbon compositions having improved resistance to ultraviolet degradation comprising petroleum hydrocarbon containing an ultraviolet stability improving quantity of a polyester of a polymethylated muconic acid selected from the group consisting of $\alpha,\beta'$-dimethylmuconic acid, $\alpha,\alpha'$-dimethylmuconic acid, $\alpha,\alpha',\beta$-trimethylmuconic acid, $\alpha,\alpha',\beta,\beta'$-trimethylmuconic acid, $\alpha,\alpha',\beta,\beta'$-tetramethylmuconic acid and mixtures thereof with a polyethylene glycol of a molecular weight in the range of 100 to 1000, said polyester having a molecular weight in the range of 600 to 20,000.

CROSS REFERENCES TO RELATED APPLICATIONS

The present application is related to applicants' following copending applications: Ser. No. 691,129, filed Dec. 18, 1967 entitled "Alpha-Olefin Polymers Having Improved Ultraviolet Stability" and now U.S. Pat. 3,511,806 issued June 30, 1970; Ser. No. 691,153, filed Dec. 18, 1967 entitled "Ultraviolet Stabilized Petroleum Hydrocarbons" and now U.S. Pat. 3,518,196 issued June 30, 1970; Ser. No. 691,199, filed Dec. 18, 1967 entitled "Ultraviolet Stabilized Elastomeric Compositions"; Ser. No. 758,574, filed Sept. 9, 1968 entitled "Polymethylated Muconic Acids and Phosphite Ester Synergistic Stabilizer Combination for Elastomer Compositions" and now U.S. Pat. 3,518,225 issued June 30, 1970; Ser. No. 731,619, filed May 23, 1968 entitled "Stabilized Latex Emulsions"; and Ser. No. 777,476, filed Nov. 20, 1968 entitled "Plastic Surface Coverings of Improved Ultraviolet Stability," each of which discloses ultraviolet stability improved compositions containing polymethylated muconic acids and their hydrocarbyl esters. The present application is also related to applicants' copending United States applications Ser. No. 805,835, entitled "Alpha-Olefin Composition Containing Polyester Stabilizers"; Ser. No. 805,871, entitled "Elastomeric Compositions Containing Phosphite Ester and Polyester Stabilizers"; and Ser. No. 805,872, entitled "Plastic Surface Coverings Containing Polyester Stabilizers" and Ser. No. 805,874 entitled "Elastomer Compositions Containing Polyester Stabilizers," each of which are filed of even date herewith.

BACKGROUND OF THE INVENTION

The present invention relates to petroleum fractions having improved ultraviolet stability. More particularly, this invention relates to petroleum fractions including petroleum distillate fuels, petroleum wax, and petroleum oil compositions containing a novel ultraviolet stability improving additive.

It is well known that refined products recovered from petroleum crude oil frequently undergo deteriorative changes in use or storage, particularly when they are exposed to ultraviolet light. One explanation given for this phenomena is that refined petroleum fractions, particularly refined oils and waxes contain components which are extremely susceptible to oxidation, especially when in the presence of oxygen or ozone and ultraviolet light. Although there is disagreement with respect to the exact mechanisms involved in these changes, there is some general agreement that this ultraviolet degradation is generally the result of oxidative changes in the petroleum fraction involved.

Oxidation of petroleum oils and waxes and distillate fuels such as gasoline is known to result in the formation of organic acids as well as polymerizable products, both of which are undesirable impurities in the petroleum composition. The presence of these impurities in the petroleum compositions often is evident in the form of discoloration of the product or precipitation of solids generally referred to as sludge. Any appreciable formation of these various degradation products can affect the properties of the petroleum hydrocarbon composition in question with the result that it may become functionally unusable or commercially undesirable because of these changes.

DESCRIPTION

It has now been discovered that a blend of petroleum hydrocarbons and new polyesters derived from certain polymethylated muconic acids or their $C_1$ to $C_{20}$ hydrocarbyl esters copolymerized with polyethylene glycols provide petroleum hydrocarbon compositions having improved resistance to ultraviolet initiated degradation.

The ultraviolet stability improving additives found to be suitable for use in the compositions of the present invention are polyesters of polymethylated muconic acids with a polyethylene glycol of molecular weight in the range of 100 to 1000. The polyesters are characterized as being normally liquid at room temperature and having a molecular weight in the range of 600 to 20,000. The ultraviolet stability improving additive is preferably present in the elastomer compositions of the present invention in the quantity of 0.01 to 20.0 weight percent based on the weight of the whole composition. The more preferred concentration of ultraviolet stability improving additive is 0.5 to 10.0 weight percent based on the weight of the whole composition.

Polymethylated muconic acids that can be used in preparing polyesters suitable for use in the compositions of the present invention include the cis-cis, cis-trans and trans-trans isomers of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$-trimethylmuconic acid, $\alpha,\alpha',\beta,\beta'$-tetramethylmuconic acid and their monoesters wherein one carboxyl group is attached to a $C_1$ to $C_{20}$ hydrocarbyl radical, or their diesters wherein each carboxyl group is attached to a $C_1$ to $C_{20}$ hydrocarbyl radical, and mixtures thereof.

The $C_1$ to $C_{20}$ hydrocarbyl esters included in the present invention are selected from the hydrocarbyl radicals of $C_1$ to $C_{20}$ hydrocarbons having acyclic, cyclic, and aromatic structures such as those disclosed in the text "Handbook of Hydrocarbons," S. W. Ferris, Academic Press, Inc., New York, N.Y. (1955), pages 145–249, all of which are incorporated herein by reference. The preferred esters of the present invention are the $C_1$ to $C_{10}$ hydrocarbyl mono- and di-esters of the polymethylated muconic acids disclosed above. Examples of the $C_1$ to $C_{10}$ hydrocarbyl groups include methyl, ethyl, butyl, pentyl, hexyl, heptyl, octyl, nonyl, decyl cyclopentyl, methyl cyclopentyl, dicyclopentyl, cyclohexyl, phenyl, tolyl, xylyl, naphthyl, tetrahydronaphthyl, decahydronaphthyl, as well as the various isomers of each.

The diester of the muconic acid can be a mixed ester. An illustrative example is the cis-cis isomer of $\alpha,\alpha'$-dimethyl-muconic acid which can be illustrated by the following structural formula:

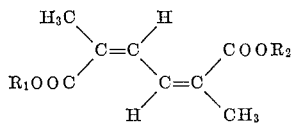

wherein $R_1$ is different from $R_2$. That is to say, $R_1$ can be a hydrocarbyl group of $C_1$ to $C_{20}$ and $R_2$ can be a different hydrocarbyl group of $C_1$ to $C_{20}$, e.g., $R_1$ equals cyclohexyl ($C_6$) and $R_2$ equals eicosyl ($C_{20}$).

Examples of some of the esters of the polymethylated muconic acids suitable for use in preparing the polyester stabilizers that can be used in the compositions of the present invention include the cis-cis, cis-trans and trans-trans isomers of the mono- and di-methyl esters of $\alpha,\beta'$-dimethylmuconic acid; the mono- and di-phenyl esters of $\alpha,\alpha',\beta,\beta'$-tetramethylmuconic acid; the mono- and di-naphthyl esters of $\alpha,\beta,\beta'$-trimethylmuconic acid; the mono- and di-5,6-diethylacenaphthyl esters of $\alpha,\alpha'$-dimethylmuconic acid; the mono- and di-cyclohexyl ester of $\alpha,\alpha'$-dimethylmuconic acid, the mono- and di-1,2-dimethylcycloheptyl esters of $\alpha,\beta'$-dimethylmuconic acid; the mono- and di-decahydronaphthyl esters of $\alpha,\alpha',\beta,\beta'$-tetramethylmuconic acid; the mono- and di-1,3-dipropylbenzyl esters of $\alpha,\alpha'$-dimethylmuconic acid; the mono- and di-2,9-dimethyl-4,7-diisobutyldecyl esters of $\alpha,\alpha',\beta$-trimethylmuconic acid; and the mono- and di-anthracyl esters of $\alpha,\beta'$-dimethylmuconic acid; mono- and di-2,6,10-trimethyl decyl esters of $\alpha,\alpha',\beta,\beta'$-tetramethylmuconic acid; and the nonyl ethyl esters of $\alpha,\alpha',\beta$-tetramethylmuconic acid.

As noted above, polymethylated muconic acids can exist in three isomeric forms, viz. cis-cis, trans-trans and cis-trans. As an example, the unsaturated diacid, $\alpha,\alpha'$-dimethylmuconic acid, can be depicted by the following structural formulas:

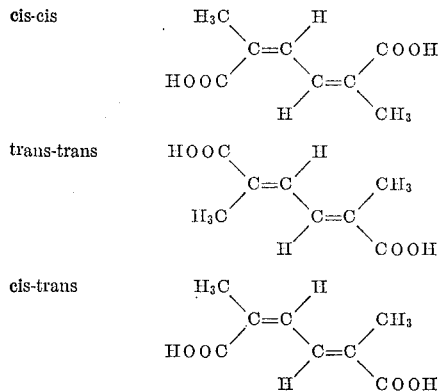

The preparation of each of these isomeric forms of the $\alpha,\alpha'$-dimethylmuconic acid has been described in the prior art by Elvidge et al., J. Chem. Soc., pages 1026–1033 (1952). These authors show that oxidation of p-xylenol by means of peracetic acid gave the cis-cis form of the acid. The other isomeric forms were obtained indirectly by conversion of the cis-cis form. Also dimethyl esters of each of the three isomeric forms were prepared by shaking the respective DMMA with ethereal diazomethane.

The cis-cis form of polymethylated muconic acids can also be obtained by biological oxidation of p-xylene utilizing special strains of microorganisms as disclosed in United States Pat. No. 3,383,289 issued May 14, 1968 of Raymond et al.

Procedures for recovering esters of the three isomeric forms of methylated muconic acids usable in the compositions of the present invention are also disclosed in United States application Ser. No. 561,736, filed June 30, 1966, now U.S. Pat. No. 3,440,158.

Polyethylene glycols suitable for use in preparing the polyester stabilizers of the present invention are generally represented by the structural formula:

$$HO[CH_2-CH_2-O]_xH$$

where $x$ equals any value in the range of 2 to 22. These polyethylene glycols are normally liquid at 25° C. and have a molecular weight in the range of 100 to 1000. Polyethylene glycols are well known standard articles of commerce. One method of preparing polyethylene glycols is disclosed in the text "Chemistry of Organic Compounds," Noller, Carl R., 2nd edition, W. B. Saunders Co., Philadelphia, Pa. (1958), page 742. One method of preparing the polyesters herein disclosed is provided in United States Patent No. 3,429,949 issued Feb. 25, 1969 to Gary L. Driscoll. Also examples of polyester compositions suitable for use in the elastomeric compositions of the present invention and methods of their preparation are disclosed in United States patent application Ser. No. 805,818 by Gary L. Driscoll filed of even date herewith.

The refined petroleum hydrocarbon fractions included in the compositions of the present invention are petroleum distillate fuel fractions, petroleum wax fractions, and petroleum oil fractions.

Petroleum distillate fuel compositions included in the compositions of the invention can be distillate petroleum hydrocarbon fractions boiling in the range of 100° to 500° F. and normally recovered from petroleum crude oil by simple distillation. Examples of petroleum distillate fuels include gasoline, kerosene, No. 1 furnace oil, No. 2 furnace oil, spirits, jet fuels, and many others well known to those skilled in the art.

The petroleum wax compositions of the present invention include waxes normally recovered from waxy petroleum crude oil by refining procedures well known in the art. These procedures are generally disclosed in Kirk and Othmer, Interscience Publishers, New York, N.Y., 1953, vol. 10, pages 211–227. Refined petroleum waxes are generally white, yellow or brown in color and are classified as paraffinic or microcrystalline. Refined petroleum waxes normally have a melting point in the range of 120°–200° F. and an SUS viscosity at 210° F. in the range of 35–90.

One method of detecting ultraviolet degradation in a petroleum wax is by visual observation of change in color intensity of the wax. This change is apparently the result of color bodies being formed as products of UV degradation. For example, an unstabilized white petroleum wax which is exposed to ultraviolet light for a period of time will yellow.

As a means of illustrating one mode of the present invention, the following examples are given:

Example I

A white paraffin petroleum wax characterized as melting at 127° F., having an SUS viscosity at 210° F. of 44 and a penetration at 77° F. of 33 (ASTM D1321) was exposed to ultraviolet light for 72 hours in accordance with the procedures outlined in ASTM D925–50. After exposure to ultraviolet light the wax was examined and found to be substantially yellowed indicating degradation of the wax has taken place.

Example II

A polyester of the dimethyl ester of trans-trans $\alpha,\alpha'$-dimethylmuconic acid was prepared as follows:

A solution of 1500 g. of cis-cis dimethylmuconic acid obtained by biological oxidation of p-xylene and dissolved in 10 liters of 6 N NaOH is refluxed for 24 hours, diluted with 5 volumes of distilled water, and brought to pH 3 with 12 N HCl. The solid which separates at this point is filtered off and dried; it contains about 80 percent of the trans-trans acid, with a lesser amount of the cis-trans acid and a minor amount of the cis-cis acid.

The crude product thus obtained is esterified by refluxing it (1400 g.) in 10 liters of methanol containing 10 cc. of concentrated $H_2SO_4$ until solution occurs. Cooling the reaction mixture yields the dimethyl ester of the trans-trans acid in substantially pure form (M.P. 102°–104° C.).

582 grams of the above-disclosed dimethyl $\alpha,\alpha'$-dimethyl-trans-trans muconate, 1170 grams of polyethylene glycol having an average molecular weight of about 300 were blended and heated in a glass polymerization vessel under a nitrogen atmosphere until the entire blend becomes molten. The melt was thereafter maintained at 200° C. while 4.0 cc. of tetraisopropyl titanate catalyst was added and maintained at that temperature for 12 hours under continuous agitation. The resultant liquid product was vacuum distilled at 1 mm. Hg pressure for 3 hours. The residue recovered comprised 1500 grams of a thick viscous polyester liquid.

Example III

Three samples of wax identical to that disclosed in Example I were heated to 135° F. and blended with 0.1, 1.0 and 2.0 weight percent respectively, based on the weight of the wax of the polyester which was prepared in the manner disclosed in Example II above. The three separate wax compositions were cooled to room temperature and thereafter exposed to ultraviolet light in the identical manner as disclosed in Example I. A visual examination of each of these three wax compositions revealed no discoloration or any other signs of ultraviolet initiated degradation in any of the three wax compositions containing the polyester additive.

Thus, a comparison of the additive containing wax compositions of Example III with the unstabilized wax composition of Example I illustrates the improved ultraviolet stability of petroleum wax achieved by the methods and compositions of this invention.

The petroleum oils suitable for use in the compositions of this invention are recovered from petroleum crude oil by refining procedures well known to those skilled in the art and generally disclosed in Kirk and Othmer, vol. 10, Interscience Publishing Co., New York, N.Y. (1953), pages 143–153. Generally, these oils are characterized as having an SUS viscosity at 100° F. of at least 50, a viscosity-gravity constant in the range of .740–.980 and boiling above 500° F. at atmospheric pressure.

Petroleum oils of the above-disclosed characteristics are normally susceptible to ultraviolet degradation which is generally recognized in the form of discoloration and/or sludge formation, both of which are undesirable.

It has been discovered that 0.01–10.0 weight percent and preferably 0.5–2.0 weight percent of the herein disclosed polyester stability improving additive when incorporated into petroleum oils hereinabove described provides a petroleum oil composition having improved resistance to ultraviolet initiated degradation.

As a means of further illustrating this invention, the following examples are herein presented:

Example IV

A solvent refined hydrotreated petroleum oil having the following characteristics:

| | |
|---|---|
| SUS viscosity at 100° F. | 100 |
| Viscosity-gravity constant | 0.872 |
| ASTM color | 0.5 |
| Gel aromatics, wt. percent | 36 | was blended with 0.25 weight percent based on the weight of the whole composition of the polyester disclosed in Example II above. This composition along with a sample of the identical oil having no additive (control) were heated to a temperature in the range of 140–150° F. and maintained at that temperature for a period of 24 hours during which time both samples were exposed to ultraviolet light in accordance with procedures outlined in ASTM D925–D11. At the end of the exposure time each sample was evaluated for sludge formation and ASTM color according to the procedures outlined in ASTM D1500. The results of these tests appear in the table under the heading of control and Example IV.

Example V

An oil composition identical to that disclosed in Example IV was prepared and tested in accordance with the procedures outlined in Example IV with the exception that 0.50 wt. percent of the polyester additive disclosed in Example II was blended with the base oil. The results of the testing of this composition appear in the table under Example V.

Example VI

An oil composition identical to that disclosed in Example IV was prepared and tested in accordance with the procedures outlined in Example IV with the exception that 1.0 wt. percent of the polyester additive disclosed in Example II was blended with the base oil. The results of the testing of this composition appear in the table under Example VI.

Example VII

An oil composition identical to that disclosed in Example IV was prepared and tested in accordance with the procedures outlined in Example IV with the exception that 2.5 wt. percent of the polyester additive disclosed in Example II was blended with the base oil. The results of the testing of this composition appear in the table under Example VII.

Example VIII

An oil composition identical to that disclosed in Example IV was prepared and tested in accordance with the procedures outlined in Example IV with the exception that 5.0 wt. percent of the polyester additive disclosed in Example II was blended with the base oil. The results of the testing of this composition appear in the table under Example VIII.

TABLE

| Sample | Wt. percent polyester | ASTM Color Before UV exposure | ASTM Color After UV exposure | Sludge formed |
|---|---|---|---|---|
| Control | 0 | 0.5 | 1.75 | Slight. |
| Example IV | 0.25 | 0.5 | 1.50 | None. |
| Example V | 0.5 | 0.5 | 1.25 | Do. |
| Example VI | 1.0 | 0.5 | 1.0 | Do. |
| Example VII | 2.5 | 0.5 | 1.0 | Do. |
| Example VIII | 5.0 | 0.5 | 1.0 | Do. |

A comparison of the results shown in the table for Examples IV–VIII with the tested control clearly demonstrates the improved resistance to discoloration and sludge formation accomplished by the addition of small quantities of polyester prepared by copolymerizing the dimethyl ester of trans-trans $\alpha,\alpha'$-dimethylmuconic acid with polyethylene glycol as disclosed in Example II.

For purposes of practicality, the amount of stability improving polyester which can be added to petroleum oils and petroleum waxes to achieve the improvements herein disclosed is in the range of 0.01–20.0 weight percent based on the whole composition. The preferred range is 0.5–10.0 weight percent.

The petroleum wax and petroleum oil compositions of the present invention can include those property improving additives such as polymers, antioxidants, fillers and extenders normally used in the preparation of commercial wax and oil compositions.

Ultraviolet stability improving polyester additives prepared from polymethylated muconic acids other than the dimethyl ester of trans-trans $\alpha,\alpha'$-dimethylmuconic acid set forth in the examples given above can be substituted therefore in any of the petroleum hydrocarbon fractions disclosed hereinabove and provide analogous results. Included among these additives are the polyesters prepared from the cis-cis, cis-trans and trans-trans isomers of any of the polymethylated muconic acids disclosed above as well as these isomers of the monesters of each of these acids wherein the esters contains a $C_1$ to $C_{20}$ hydrocarbyl group and also the diesters of each of these acids wherein each ester contains a $C_1$ to $C_{20}$ hydrocarbyl group. Any combination of the polyester additives disclosed hereinabove with any of the disclosed refined petroleum hydrocarbon fractions provide results analogous to those disclosed in the examples given above. Also, petroleum waxes, oils and distillate fuels other than those disclosed in the examples stated above can be utilized in the compositions of the present invention with analogous results being obtained.

Compositions in which refined petroleum hydrocarbon fractions form a significant part, e.g., lubricating greases, wax coating compositions, etc., which are subject to ultraviolet degradation fall within the scope of the compositions suitable to be included in the present invention.

The invention claimed is:

1. A refined petroleum hydrocarbon composition having improved ultraviolet stability comprising a refined petroleum hydrocarbon fraction selected from the group consisting of petroleum hydrocarbon wax, petroleum hydrocarbon oil and petroleum hydrocarbon distillates containing an ultraviolet stability improving quantity of a polyester of a polymethylated muconic acid selected from the group consisting of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$ - trimethylmuconic acid, $\alpha,\alpha',\beta,\beta'$ - tetramethylmuconic acid and mixtures thereof with a polyethylene glycol having a molecular weight in the range of 100 to 1000, said polyester having a molecular weight in the range of 600 to 20,000.

2. A composition according to claim 1 wherein the ultraviolet stability improving polyester is derived from the cis-cis isomer of said polymethylated muconic acids.

3. A composition according to claim 2 wherein the quantity of ultraviolet stability improving material is in the range of 0.5 to 10 weight percent.

4. A composition according to claim 3 wherein said polymethylated muconic acid is $\alpha,\alpha'$-dimethylmuconic acid.

5. A composition according to claim 3 wherein the refined petroleum hydrocarbon fraction is wax.

6. A composition according to claim 3 wherein the refined petroleum hydrocarbon fraction is an oil.

7. A composition according to claim 4 wherein the refined petroleum hydrocarbon fraction is wax.

8. A composition according to claim 4 wherein the refined petroleum hydrocarbon fraction is an oil.

9. A composition according to claim 1 wherein the ultraviolet stability improving polyester is derived from the trans-trans isomer of said polymethylated muconic acids.

10. A composition according to claim 9 wherein the quantity of ultraviolet stability improving material is in the range of 0.5–10 weight percent.

11. A composition according to claim 10 wherein said polymethylated muconic acid is $\alpha,\alpha'$-dimethylmuconic acid.

12. A composition according to claim 10 wherein the refined petroleum hydrocarbon fraction is wax.

13. A composition according to claim 10 wherein the refined petroleum hydrocarbon fraction is an oil.

14. A composition according to claim 11 wherein the refined petroleum hydrocarbon fraction is wax.

15. A composition according to claim 11 wherein the refined petroleum hydrocarbon fraction is an oil.

16. A method of preparing a refined petroleum hydrocarbon composition according to claim 1 having improved ultraviolet stability which comprises incorporating into a refined petroleum hydrocarbon fraction selected from the group consisting of petroleum hydrocarbon waxes, petroleum hydrocarbon oils and petroleum hydrocarbon distillates an ultraviolet stability improving quantity of a polyester of a polymethylated muconic acid selected from the group consisting of $\alpha,\alpha'$-dimethylmuconic acid, $\alpha,\beta'$-dimethylmuconic acid, $\alpha,\alpha',\beta$-trimethylmuconic acid, $\alpha,\beta,\beta'$ - trimethylmuconic acid, $\alpha,\alpha',\beta,\beta'$ - tetramethylmuconic acid and mixtures thereof with a polyethylene glycol having a molecular weight in the range of 100 to 1000, said polyester having a molecular weight in the range of 600 to 20,000.

References Cited

UNITED STATES PATENTS

| | | | |
|---|---|---|---|
| 3,349,051 | 10/1967 | Alexander | 260—28 |
| 3,429,949 | 2/1969 | Driscoll | 260—485 G |
| 3,440,275 | 4/1969 | Suld | 252—56 |

MORRIS LIEBMAN, Primary Examiner

P. R. MICHL, Assistant Examiner

U.S. Cl. X.R.

44—62, 70; 106—270